(No Model.)
G. D. LEWIS & P. S. BOSWORTH.
STEP FOR VEHICLES.
No. 566,919. Patented Sept. 1, 1896.
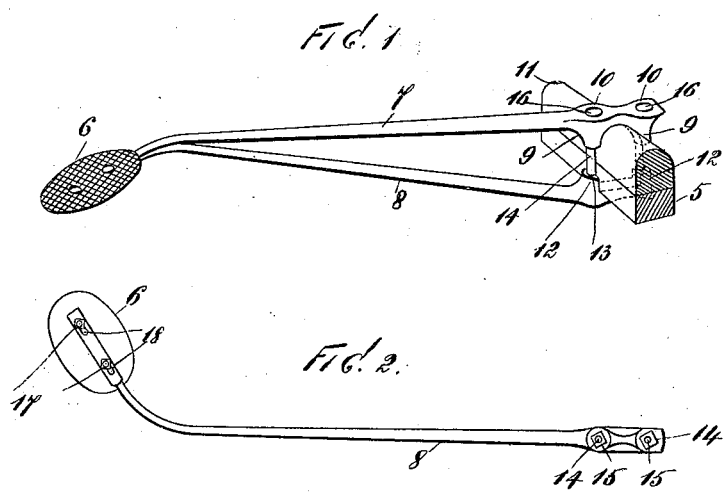
WITNESSES
John Buckler,
C. Gerst
INVENTORS
George D. Lewis &
Peleg S. Bosworth.
BY
Edgar Tate &Co
ATTORNEYS

UNITED STATES PATENT OFFICE.

GEORGE D. LEWIS AND PELEG S. BOSWORTH, OF NEWPORT, RHODE ISLAND.

STEP FOR VEHICLES.

SPECIFICATION forming part of Letters Patent No. 566,919, dated September 1, 1896.

Application filed June 15, 1896. Serial No. 595,599. (No model.)

*To all whom it may concern:*

Be it known that we, GEORGE D. LEWIS and PELEG S. BOSWORTH, citizens of the United States, and residents of Newport, in the county of Newport and State of Rhode Island, have invented certain new and useful Improvements in Steps for Vehicles, of which the following is a specification, reference being had to the accompanying drawings, forming a part thereof, in which similar numerals of reference indicate corresponding parts wherever found throughout both views.

This invention relates to steps for vehicles; and the object thereof is to provide a secure and unyielding step to be mounted in entering a vehicle, which step is mounted or fixed upon a rigid portion of the vehicle, thereby avoiding the throwing of the weight of a person entering the vehicle upon the horse.

The invention is fully disclosed in the following specification, of which the accompanying drawings form a part, in which—

Figure 1 is a perspective view of the axle of a vehicle, showing a step rigidly connected therewith in accordance with our invention; and Fig. 2 is a bottom plan view of the step and its attachments.

In the drawings forming part of this specification we have shown at 5 the axle of a vehicle, and in the practice of our invention we provide a step 6, which is connected with the axle by an arm 7 and a brace 8. The arm 7 is provided at its inner end with two downwardly-directed shoulders or projections 9, which are provided with vertical bores or openings 10, and the space between said shoulders or projections is preferably concave or yoke-shaped in form, so as to closely fit the upper part of the axle, which is convex in cross-section, as shown at 11.

The inner end of the brace 8 is provided with two similar upwardly-directed shoulders or projections 12, one of which is shown in dotted lines and the other in full lines, and said shoulders or projections 12 are also provided with vertical bores or openings 13, and through these bores or openings 13 are passed bolts 14, and said bolts are provided, preferably at their lower ends, with nuts or burs 15, by means of which the inner ends of the arm 7 and the brace 8 are securely bolted to the axle.

The heads of the bolts 14 are preferably countersunk in the arm 7, as shown at 16, and it will be observed that the space between the upwardly-directed shoulders or projections 12 on the brace 8 is angular in form, so as to correspond with the bottom and sides of the axle 5, which is also angular in form in cross-section, and by this means the step is rigidly secured to the axle and cannot move thereon.

The ends of the arm 7 and the brace 8 are brought together and securely bolted to the under side of the step, as shown at 17, and the outer ends of said arm and said brace are flat and are placed one upon the other and preferably provided with longitudinal slots 18, by means of which the position of the step may be slightly adjusted, if desired; but this feature of construction is not essential. By connecting the step with the axle in this manner we avoid cutting the latter or boring the same, and at the same time the step is snugly and rigidly connected therewith, and the step may be of any desired form, and the upper surface thereof is preferably corrugated or provided with serrations, so as to prevent the foot from slipping therefrom. When the step is secured to the axle in the manner described, it is absolutely unyielding, and our improved step may be cheaply manufactured and applied and may also be applied to any style of vehicle, and by connecting the same with the axle, as herein described, we avoid injuring the back of a horse, which frequently results when the step is applied to the shaft of the vehicle or to a part thereof.

Having fully described our invention, we claim as new and desire to secure by Letters Patent—

1. The combination with the axle of a vehicle, of a step which is secured thereto, by means of an arm and of a brace, said arm being provided at its inner end with two downwardly-directed shoulders or projections, which are adapted to inclose the upper part of the axle, and said brace being provided at its inner end with two upwardly-directed shoulders or projections, which are adapted to inclose the bottom of the axle, said parts being connected by means of bolts which are passed vertically through said shoulders or projections, substantially as shown and described.

2. The combination with the axle of a vehicle, of a step which is secured thereto, by means of an arm and of a brace, said arm being provided at its inner end with two downwardly-directed shoulders or projections, which are adapted to inclose the upper part of the axle, and said brace being provided at its inner end with two upwardly-directed shoulders or projections, which are adapted to inclose the bottom of the axle, said parts being connected by means of bolts which are passed vertically through said shoulders or projections, and said arm and said brace being brought together at their outer ends beneath the step which is secured thereto, substantially as shown and described.

In testimony that we claim the foregoing as our invention we have signed our names, in presence of the subscribing witnesses, this 10th day of June, 1896.

GEO. D. LEWIS.
PELEG S. BOSWORTH.

Witnesses:
WM. G. WARD, Jr.,
ANNA C. WARD.